(12) United States Patent
Starratt

(10) Patent No.: US 6,418,881 B1
(45) Date of Patent: Jul. 16, 2002

(54) LEASH POUCH

(76) Inventor: Antoinette Marie Starratt, 469 Ancaster Ave., Ottawa, Ontario (CA), K2B 5B6

(*) Notice: Subject to any disclaimer, the term of this patent is extended or adjusted under 35 U.S.C. 154(b) by 0 days.

(21) Appl. No.: 09/592,452

(22) Filed: Jun. 12, 2000

(51) Int. Cl.⁷ .............................................. A01K 27/00
(52) U.S. Cl. ..................... 119/795; 150/114; 119/769
(58) Field of Search ..................... 119/795, 769, 119/792, 791, 867; 150/114, 117, 107

(56) References Cited

U.S. PATENT DOCUMENTS

| | | | |
|---|---|---|---|
| 4,177,909 A | * 12/1979 | Haskell | 150/100 |
| 4,502,417 A | * 3/1985 | Jenkins | 119/868 |
| 5,363,809 A | 11/1994 | Roe | |
| 5,441,017 A | 8/1995 | Lindsay | |
| 5,560,321 A | * 10/1996 | Hess | 119/858 |
| 5,692,836 A | 12/1997 | Mitchell | |
| 5,727,500 A | 3/1998 | Conboy | |
| 5,890,637 A | 4/1999 | Furneaux | |
| 6,019,067 A | 2/2000 | Carey | |
| 6,035,809 A | 3/2000 | Fingerett et al. | |

FOREIGN PATENT DOCUMENTS

| | | |
|---|---|---|
| CA | 2055507 | 11/1999 |
| GB | 2 331 005 | 5/1999 |
| GB | 2 337 190 | 11/1999 |
| JP | 9-294497 | 11/1997 |

* cited by examiner

Primary Examiner—Charles T. Jordan
Assistant Examiner—Judith A. Nelson
(74) Attorney, Agent, or Firm—Jackson Walker L.L.P.

(57) ABSTRACT

Disclosed is a leash pouch for storing disposable bags and for temporarily storing animal waste comprising a first pocket having an opening, a second, pocket having an opening, the second pocket having a device for at least partially restricting its opening whereby at least one disposable plastic bag can be stored in the second pocket. The first pocket also has a device for selectively closing its opening, the first pocket being adapted to temporarily store a plastic bag having animal waste therein. The pouch has an upper fastener device for detachable securement to a handle portion of a leash for the animal and has a lower device for slidable connection with a linear portion of the leash.

5 Claims, 4 Drawing Sheets

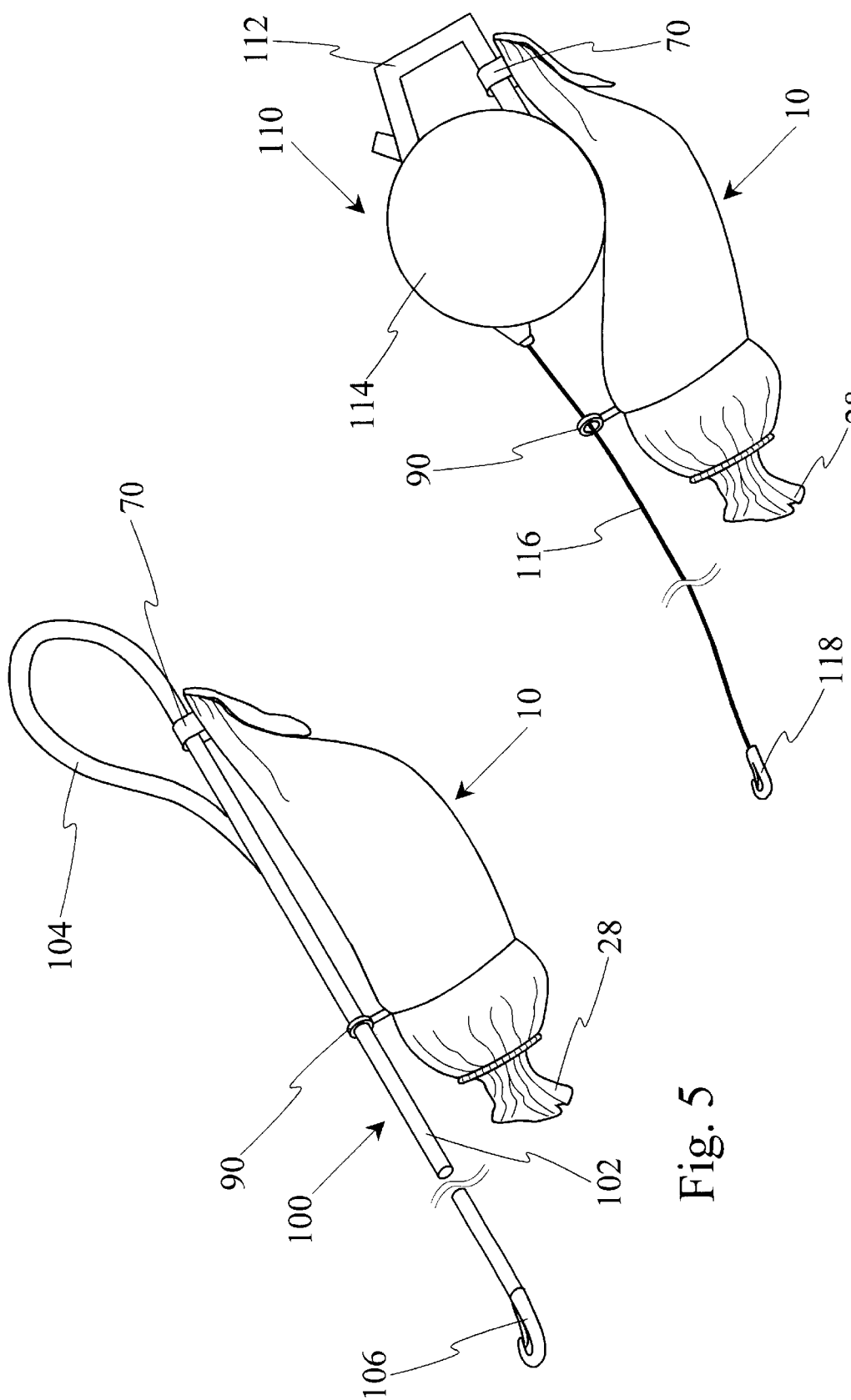

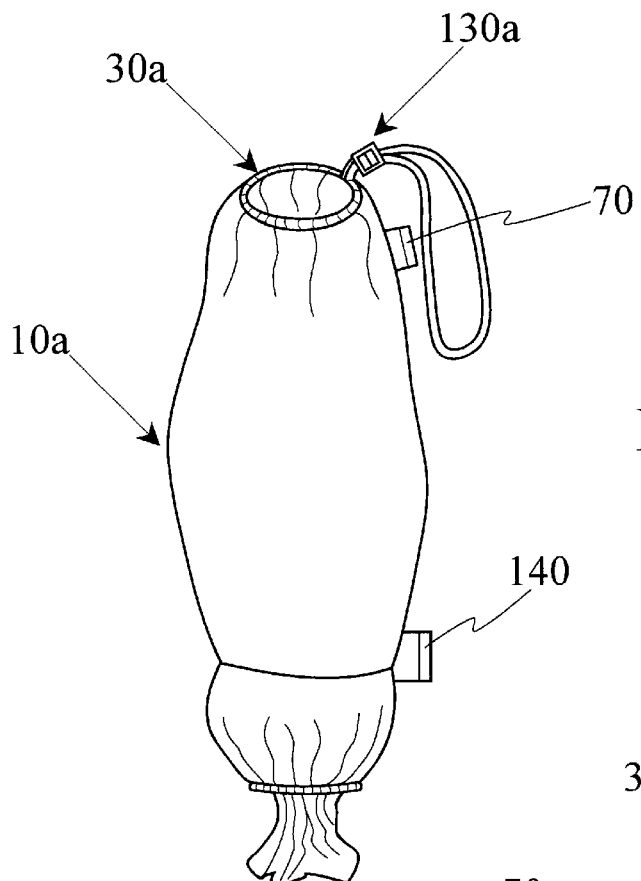
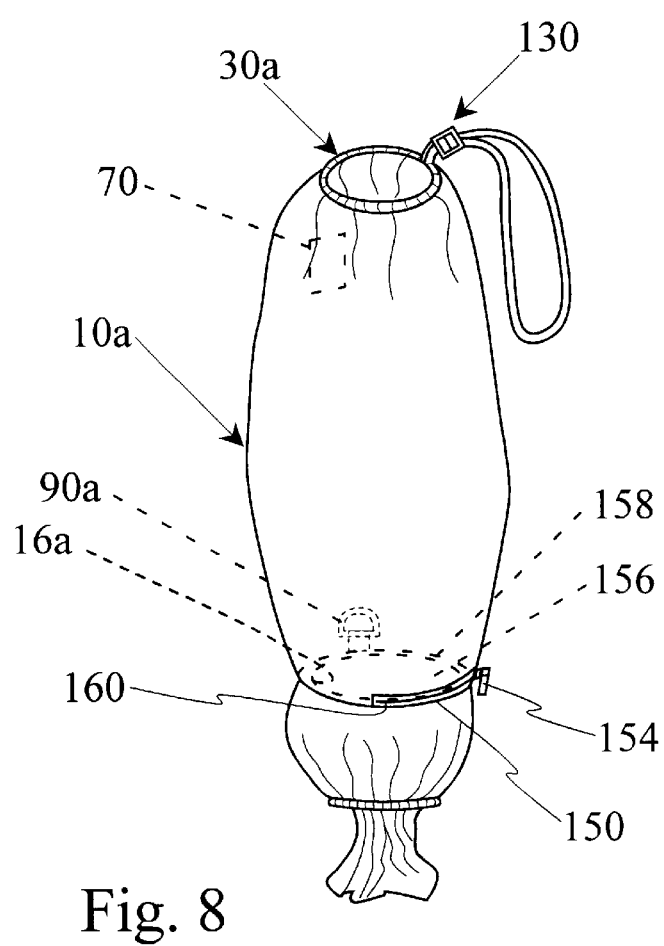

LEASH POUCH

FIELD OF THE INVENTION

The invention relates to a storage device adapted to be detachably secured to a domesticated animal leash and more particularly to a storage device for disposable plastic bags to be used for dog waste when walking the animal and for temporarily storing a bag with waste therein.

BACKGROUND OF THE INVENTION

Canadian Patent File No. 2,055,507 laid open May 14, 1993 of Cormier et al relates to a pooh pouch consisting of a pouch for retrieving and storing dog excrement. The pouch is stored in a sac and the sac has a detachable ring hook fastener which is used to attach the sac and pouch to the loop portion of a leash. The pouch opens at the top and on the inside of the pouch there is a glove which is used in conjunction with a disposable plastic bag placed over the glove on a hand and used to retrieve the fecal matter. The pouch is pulled back over the glove and plastic bags for storing the matter inside the pouch. The apparatus is reattached to the ring on the dog's leash.

U.S. Pat. No. 6,019,067, Feb. 1, 2000 to Carey relates to an animal restraint storage receptacle which is adapted to be attached to the loop of a leash and includes a body portion for holding plastic bags and the like therein while providing access to the plastic bags by a free hand of the individual holding a portion of the leash in the other hand. The receptacle includes two hook/loop type fabric fasteners to secure the receptacle to the linear portion of the leash, to the loop portion of the leash, or, in a preferred embodiment, entirely to a triangularly configured handle portion of the leash.

U.S. Pat. No. 6,035,809, Mar. 14, 2000 to Fingerett et al also relates to a leash pouch for animal waste. The pouch for containing disposable bags attaches to the leash using a mounting device to free the pet owner's hands. The pouch has two pockets, one on each side, one to carry disposable bags and the other in which to place the waste within a disposable bag for later disposal. The pouch is particularly adapted for retractable leashes now popular with many pet owners.

Notwithstanding the variety of pouches for carrying disposable bags and having storage means for collected waste, there continues to be a need for a simple pouch device which is adaptable to both, the standard loop handled leash as well as a leash having an extension/retractable mechanism and which does not unduly interfere with the loop or handle of the leash in use.

SUMMARY OF THE INVENTION

The invention in one broad aspect pertains to a leash pouch for storing disposable bags and for temporarily storing animal waste comprising a first pocket having an opening, a second pocket having an opening, the second pocket having a device for at least partially restricting its opening whereby at least one disposable plastic bag can be stored in the second pocket. The first pocket also has a device for selectively closing its opening, the first pocket being adapted to temporarily store a plastic bag having animal waste therein. The pouch has an upper fastener device for detachable securement to a handle portion of a leash for the animal and has a lower device for slidable connection with a linear portion of the leash.

The invention in another broad aspect provides a leash pouch for storing disposable bags and temporarily storing animal waste comprising an upper pocket having an open end, a lower pocket having an open end, the pockets being longitudinally aligned with each other. The lower pocket portion has a device for partially restricting the opening whereby at least one disposable plastic bag can be stored but easily withdrawn. The upper pocket has a closure device for selectively closing the open end thereof, the upper pocket being adapted to temporarily store a plastic bag having animal waste therein. The pouch has securement devices for detachable securement of the pouch to a leash for the animal.

In a preferred aspect of the invention, the upper detachable securement device comprises overlapping flaps of material having hook and loop type fabric fasteners and the lower detachable securement device comprises a D-ring secured to the pouch whereby the linear portion of the leash can pass therethrough.

Other aspects of the invention will become evident from the description of preferred embodiments of the invention which follow.

BRIEF DESCRIPTION OF THE DRAWINGS

FIG. 5 is a view of the pouch as shown in FIG. 1 attached to a leash having a looped handle.

FIG. 6 is a view of the pouch as shown in FIG. 1 attached to an extensible/retractable leash.

FIG. 7 is a side view of a modified pouch showing a modification to the closure of its upper pocket.

FIG. 8 is a front view of a modified pouch showing a modification in the wall construction between the upper and lower pockets to provide a further pocket.

DESCRIPTION OF THE PREFERRED EMBODIMENT

Figure 1:
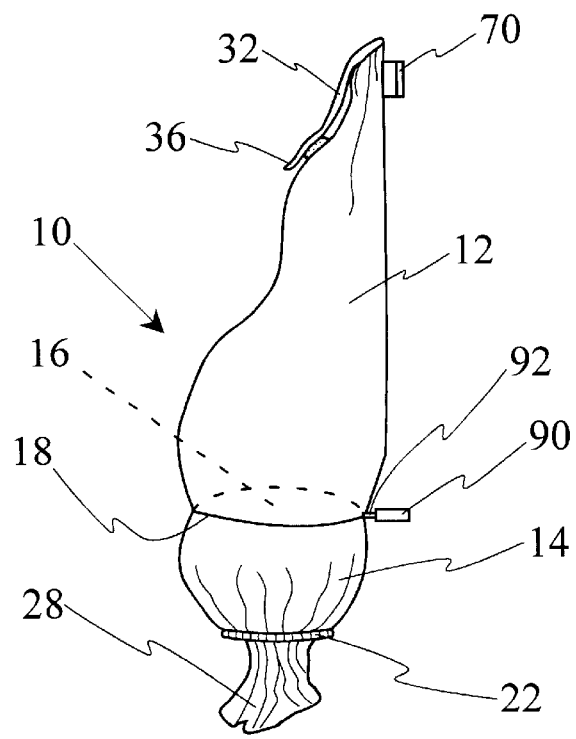
FIG. 1 is a right side view of the pouch, partly in section, according to a preferred embodiment of the invention.
Figure 2:
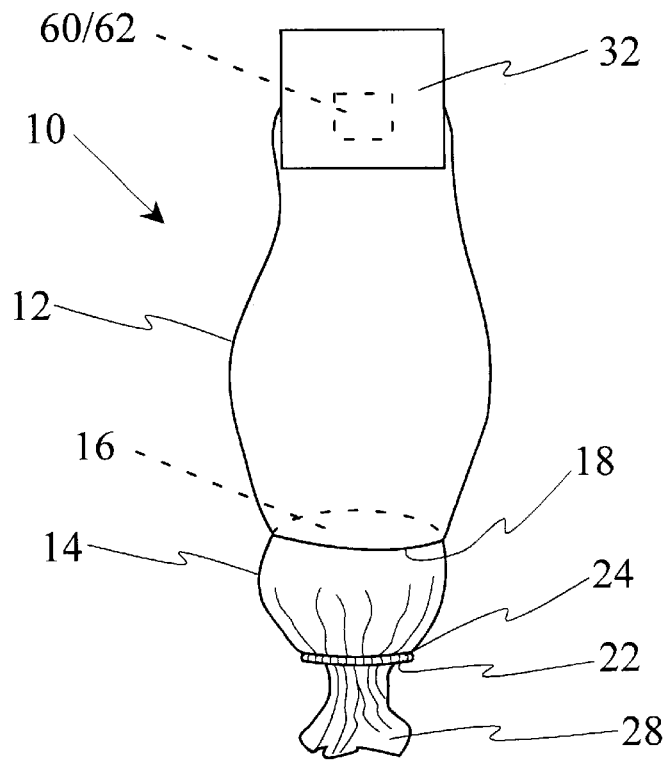
FIG. 2 is a front view of the pouch as shown in FIG. 1.
Figure 3:
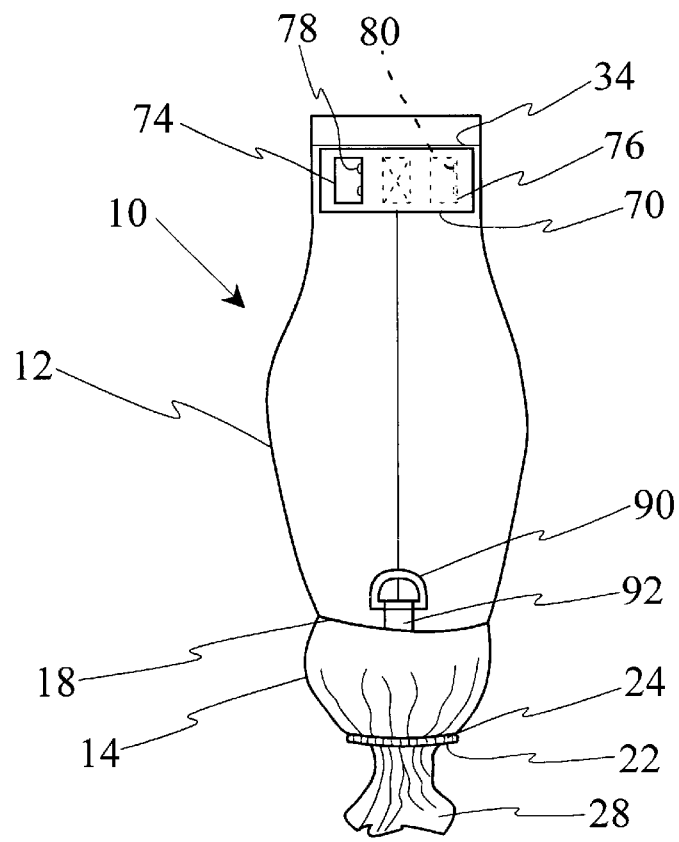
FIG. 3 is a back view of the pouch as shown in FIG. 1.

Turning to FIGS. 1, 2, 3 and 4, pouch 10 is made of fabric, preferably water impermeable fabric such as nylon, having upper pocket portion 12 and lower pocket portion separated by a fabric wall 16, (shown in dotted lines in FIGS. 1 and 2), the stitching line 18 being seen in FIGS. 1, 2 and 3.

Lower pocket 14 is smaller in volume than upper pocket 12. Lower pocket 14 has an open end 22 which is partially closed off by an expandable, elasticized material such as rubber or bungee cord type material 24, sewn into a seam associated with open end 22. Lower pocket 14 is adapted to hold, at least one empty disposable plastic bag, a portion 28 thereof being shown outside pocket 14.

Upper pocket 12, larger than lower pocket 14, has an upper opening 30, (FIG. 4), closed by a flap 32. Flap 32 is sewn to the back of upper pocket 14 along seam line 34 as shown in FIG. 4.

Figure 4:
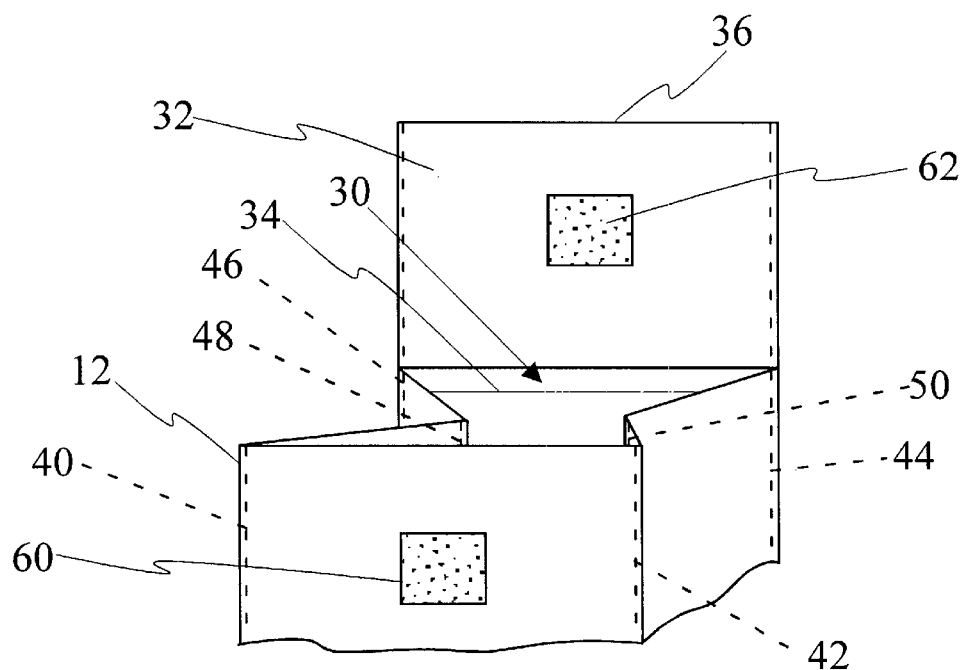
FIG. 4 is an enlarged view of the open top only of the pouch of FIG. 1 whereby a plastic bag containing dog waste can be inserted and temporarily stored in a pocket in the pouch.

Tacks or pleats 40, 42, 44, 46, 48, 50 are sewn into the upper portion of the pocket 14 from the opening 30 downwardly as shown in FIG. 4, a distance which is about equal to the length of the flap from seam 34 to front edge 36. Pocket opening 30 has a squarish appearance as a result of the pleats and folds neatly as shown in FIGS. 2 and 4. Hook and loop type fabric fastener devices 60, 62, such as that sold under the trade mark VELCRO, is used to detachably secure the flap 32 in place to close opening 30.

Two longitudinally spaced securement means are provided to attach the pouch to a leash. More particularly, upper detachable securement device 70 comprises material sewn into the back of upper pocket 12 and defining overlapping releasable flaps 74, 76 having a hook and loop type fabric fastener system 78 and 80. Lower securement device comprises a D-ring 90 secured into fabric tab 92 which is sewn into the back of the pouch 10 in an area of wall 16 and stitching 18. D-ring 90 is large enough that a detachable fastener device by which the leash is attached to a dog's collar can pass through.

In use, turning to FIGS. 5 and 6, pouch 10 is secured to a leash 100 having linear portion 102 and loop portion 104. Linear portion 102 is of fixed length with a fastener device 106 adapted for detachable securement to the collar, (not shown), of a dog.

Fastening device 106 is threaded through D-ring 90 and then upper detachable securing device 70 is secured around a lower part of the loop portion 102 as shown in FIG. 5. If device 106 happens to be larger than the size of D-ring 90, then invariably the hoop portion 104 of leash 100 can be passed through D-ring 90.

If the owner has an extensible/retractable leash 110 as shown in FIG. 6, having a handle 112, retraction housing 114, cable 116 and dog collar fastener device 118, device 118 is threaded through D-ring 90 and upper detachable securing device 70 is fastened about handle 112 as shown in FIG. 6. This allows the extensible/retractable cable 116 to run through a D-ring without causing fraying of the lower securement device 90.

It will be apparent however that modifications and variations on the invention from that specifically set forth above are possible. By way of example, upper opening 30a of pouch 10a could be closed by a known draw string device 130 such as shown in FIGS. 7 and 8. Further, although a D-ring 90a is preferable for the lower securement device, a lower securement device 140, (FIG. 7), of a hook and loop type fabric fastener similar to upper securement device 70 could be used, in which case a more sturdy material or material lined with reinforcement material can be used to lessen abrasion if the pouch 10a is used with an extensible/retractable device of the type shown in FIG. 6.

Still further, a third pocket 150 can be formed with appropriate closure means 154, such as a zipper or hook/loop fabric fastener by forming wall 16a of two materials 156, 158 with an opening 160 between wall materials 156, 158 in the area of stitching 18 as shown in FIG. 8, the opening being closed by closure means 154. This pocket can be used to carry identification papers or the like.

It will be further appreciated that other modifications are possible including relocating the plastic bag pocket 14 to the side of pouch 10 or relocating pocket 150 to the side of the pouch and the use of buttons, dome fasteners or other means to close the pockets.

While I have set forth preferred embodiments of the invention above, my invention is not limited thereby except as defined in the appended claims.

What is claimed is:

1. A leash pouch device for storing disposable bags and temporarily storing animal waste and adapted to be used with a leash of fixed length or a retractable leash device, comprising:

an upper pocket and a lower pocket, said upper pocket having an upwardly directed open end and said lower pocket having a downwardly directed open end;

said pockets being longitudinally aligned with each other with a wall divider therebetween, said upper pocket being longer than said lower pocket;

said lower pocket having a lower pocket closure means for partially restricting the opening whereby at least one disposable plastic bag can be stored and easily withdrawn downwardly from said lower pocket;

said upper pocket having upper pocket closure means for selectively closing the open end of the upper pocket, said upper pocket being adapted to temporarily store at least one plastic bag having animal waste therein;

said pouch device having securement means for detachable securement to a leash for the animal, said leash including a looped handle portion and a linear portion, said securement means including upper securement means and lower securement means, said upper securement means being adjacent said upwardly directed open end and comprising detachable fastening means for detachable connection with said looped handle portion of said leash, said lower securement means being adjacent said lower pocket and adapted to loosely encircle said linear portion of the leash and of a material and of a size whereby the linear portion of the leash can move through the lower securement means and relative to said lower securement means when the pouch device is used with a retractable leash device.

2. The leash pouch device of claim 1 wherein the lower securement means is a ring and of a diametric size that a dog collar fastener device can pass therethrough when assembling the pouch device with a retractable leash device.

3. The leash pouch device of claim 1 wherein said means for closing the open end comprises overlapping flaps of material having hook and loop type fabric fastening means.

4. The leash pouch device of claim 1 wherein said means for closing the open end comprises a draw string device.

5. The leash pouch device of claim 1 wherein said wall divider comprises two walls of material defining a third pocket between said two walls of material, an opening in the side of said pouch to said third pocket and means to selectively close said third pocket opening.

\* \* \* \* \*